Patented May 31, 1949

2,471,850

UNITED STATES PATENT OFFICE 2,471,850

LIQUID POLYSILOXANE LUBRICANTS

Donald F. Wilcock, Saugus, Mass., assignor to General Electric Company, a corporation of New York No Drawing. Application September 25, 1946, Serial No. 699,356

5 Claims. (Cl. 252—49.6)

The present invention relates to liquid organo-substituted polysiloxanes employed as lubricating media which have low frictional properties, and methods of preparing the same. More particularly, the invention is concerned with a lubricating oil having a low boundary friction coefficient, which oil is free of water and comprises (1) a liquid aliphatic-substituted polysiloxane containing an average of from about 1.9 to 2.5 aliphatic groups per silicon atom and (2) a small amount of an additive selected from the class of higher saturated aliphatic fatty acids containing from 8 to 14 carbon atoms, inclusive, preferably from 10 to 14 carbon atoms.

The physical properties of liquid organo-substituted polysiloxanes containing an average of from about 1.9 to 2.5 aliphatic groups per silicon atom make them a very ideal fluid for lubrication under hydrodynamic or fluid film conditions. Many of these liquid aliphatic-substituted polysiloxanes have low viscosity temperature coefficients, low pour points, and good resistance to oxidation up to temperatures as high as 175° C. However, such materials when employed for lubricating purposes, under certain lubricating conditions where a fluid film has not been formed or has been broken down, may not afford the protection against seizure that has come to be expected from petroleum-base oils of like viscosity. This disparity in boundary lubrication properties is particularly pronounced where both rubbing surfaces are steel and may not be quite as pronounced where one of the rubbing surfaces is a non-ferrous material such as bronze.

The liquid aliphatic-substituted polysiloxanes with which this invention is concerned are compositions comprising essentially silicon atoms connected to one another by oxygen atoms as illustrated by the following structure called a siloxane structure $$-\mathrm{Si}-\mathrm{O}-\mathrm{Si}-$$

wherein a preponderant number of the valences of the silicon atoms are satisfied by the substitution thereon of organic radicals, e. g., aliphatic radicals. These compositions of matter may be prepared, for example, by the hydrolysis of hydrolyzable aliphatic-substituted silanes, e. g., dialiphatic-substituted dihalogenosilanes, for instance, dimethyl dichlorosilane, followed by complete or partial condensation of the hydrolysis product. They may also be prepared by hydrolyzing mixtures of hydrolyzable dialiphatic-substituted silanes either among themselves or with hydrolyzable silanes containing, for example, three aliphatic radicals substituted on the silicon atom, for instance, trimethyl chlorosilane. More specific directions for the hydrolysis of hydrolyzable aliphatic-substituted silanes to form liquid aliphatic-substituted polysiloxanes may be found, e. g., in Patnode applications, Serial Nos. 463,813 (abandoned), 463,814 (Patent No. 2,469,888) and 463,815 (abandoned), filed October 29, 1942, and in Wilcock application, Serial No. 656,162 (pending), filed March 21, 1946, the foregoing applications being assigned to the same assignee as the present invention.

By the term "hydrolyzable aliphatic-substituted silanes" is intended to mean derivatives of $SiH_4$ which contain hydrolyzable groups or radicals, e. g., halogens, amino groups, alkoxy, aryloxy, and acyloxy radicals, etc., in addition to the aliphatic groups substituted directly on the silicon atom that are joined to the silicon through carbon-silicon linkages. Examples of such aliphatic radicals (including alkyl radicals) are, e. g., methyl, ethyl, propyl, butyl, etc.; alicyclic radicals, e. g., cyclopentyl, cyclohexyl, etc.; alkenyl radicals, e. g., vinyl, allyl, methallyl, etc. If desired, the above-mentioned radicals may also contain substituents substituted thereon, for instance, halogens.

Hydrolysis of the above silanes or mixtures of the silanes results in the formation of silanols, i. e., aliphatic-substituted silanes containing hydroxy groups substituted directly on the silicon, which hydroxy groups almost immediately condense intermolecularly (intercondense) splitting out water to give the siloxane linkages mentioned previously. Such intercondensations are accelerated by acidic materials, e. g., sulfuric acid, hydrochloric acid, ferric chloride, etc., as well as by basic materials, e. g., sodium hydroxide, ammonium hydroxide, etc. As a result of the hydrolysis and condensation, aliphatic-substituted polysiloxanes may be produced which are partially or completely condensed and which may have on the average up to as high as three or ganic radicals substituted per silicon atom. The liquid aliphatic-substituted polysiloxanes prepared in this manner consist essentially of silicon atoms joined together by oxygen atoms through silicon-oxygen linkages and aliphatic radicals attached to silicon through carbon-silicon linkages, the remaining valences, if any, of the silicon atoms being satisfied by hydroxyl radicals and/or by residual unhydrolyzed radicals such as the hydrolyzable radicals listed previously.

I have now found that the frictional properties of liquid aliphatic-substituted polysiloxanes containing from about 1.9 to 2.5 aliphatic groups per silicon atom may be greatly improved by incorporating in the said liquid polysiloxane a small amount of an additive selected from the class of saturated aliphatic fatty acids containing from 8 to 14 carbon atoms, for example, octanoic acid (caprylic acid), lauric acid, myristic acid, capric acid, etc. This was quite surprising and unexpected since many of the additives incorporated in petroleum-base lubricants for the purpose of decreasing the boundary friction coefficient were either insoluble in the liquid aliphatic-substituted polysiloxanes or ineffective for lowering their boundary friction coefficients.

The amount of additive required to effectively lower the boundary friction coefficient of the liquid polysiloxanes is quite small. Thus, by weight, I may employ from about .05 to 4 or 5 per cent of the additive based on the weight of the liquid polysiloxane and depending, in some cases, on the particular combination of additive and polysiloxane employed. Preferably, I employ from about 0.1 to 2 per cent of the additive. Amounts substantially in excess of 2 or 3 per cent offer no particular advantage. The modified liquid polysiloxanes obtained by the practice of my invention exhibit good lubricating properties as evidenced by the ability of the liquid polysiloxane to maintain a continuous lubricating film on the rubbing metallic surfaces during load-bearing periods of operation. In order that those skilled in the art may better understand how the present invention may be practiced, the following examples are given by way of illustration and not by way of limitation. All parts and per cents are by weight. The boundary friction coefficient was determined by means of a four ball deceleration top using two steel surfaces sliding under boundary lubrication conditions. The instrument and procedure employed for determining the boundary friction coefficient was essentially the same as that described by Beeck et al. in the Proceedings of the Royal Society of London, A177, 90 (1940). In the following examples the top employed in the four ball deceleration top weighed 5800 grams and the moment of inertia was calculated to be 747,000 gram cm.$^2$.

*Example 1*

A liquid methylpolysiloxane containing an average of slightly above two methyl groups per silicon atom was prepared by hydrolyzing substantially pure dimethyldichlorosilane and thereafter effecting rearrangement of the siloxane units with hexamethyl disiloxane in the presence of concentrated sulfuric acid in accordance with the procedure disclosed in the aforementioned Patnode application Serial No. 463,814. The viscosity of the oily liquid was about 42 centistokes at 100° F.

To the above prepared liquid methyl polysiloxane were added varying amounts of additives, and the boundary friction coefficient of each of the mixtures was determined by means of the aforementioned four ball deceleration top. For comparison purposes, a petroleum oil (a white sulfuric-acid-refined mineral oil of refrigerator grade) was repurified by contacting it with concentrated sulfuric acid and tested in the four ball deceleration top to determine the boundary friction coefficient of this material. Following are the results of these tests which are the average of at least two runs each:

*Table I*

| Oil | Additive | Per Cent Additive | Boundary Friction Coefficient |
|---|---|---|---|
| Petroleum [1] | | | 0.13 |
| Liquid methyl polysiloxane | | | 0.26 |
| Do | n-capric acid | 0.5 | 0.12 |
| Do | do | 5.0 | 0.10 |
| Do | do | 1.0 | 0.10 |
| Do | Lauric acid | 0.5 | 0.13 |
| Do | do | 0.3 | 0.13 |
| Do | do | 0.25 | 0.12 |
| Do | do | 0.13 | 0.16 |
| Do | Myristic acid | 0.13 | 0.16 |
| Do | do | 0.25 | 0.11 |

[1] Viscosity was 85 to 95 Saybolt seconds at 100° F.

It will, of course, be understood by those skilled in the art that saturated aliphatic fatty acids containing from 8 to 14 carbon atoms other than those employed in the above illustrations of the practice of my invention may also be used as, for example, pelargonic acid, undecylic acid, tridecoic acid, etc., as well as the branched chain saturated aliphatic fatty acids as, for example, 2-ethyl hexanoic acid, etc.

The use of additives in accordance with my invention is especially adaptable for improving the lubricating properties of other liquid aliphatic-substituted polysiloxanes, for instance, liquid alkyl-substituted polysiloxanes, for example, liquid ethy-, propyl-, butyl-, isopropyl-substituted polysiloxanes, etc. The additives employed in the practice of my invention are particularly suitable for decreasing the boundary friction coefficient of liquid methyl polysiloxanes containing an average of from about 1.9[1] to 2.5 methyl groups per silicon atom, especially where the average ratio of methyl groups to silicon atoms is from about 2.0 to 2.2 methyl groups per silicon.

What I claim as new and desire to secure by Letters Patent of the United States is:

1. A lubricant having a low boundary friction coefficient which consists essentially of (1) a water-free liquid aliphatic-substituted polysiloxane containing an average of from about 1.9 to 2.5 aliphatic groups per silicon atom, the said aliphatic groups being selected from the class consisting of lower alkyl, lower alkenyl, and cyclic alkyl radicals, and (2) from about 0.05 to 5 per cent, by weight, based on the weight of (1), of an additive selected from the class of saturated aliphatic fatty acids containing from 8 to 14 carbon atoms.

2. A lubricant having a low boundary friction coefficient which consists essentially of (1) a liquid water-free methyl polysiloxane containing an average of from about 1.9 to 2.5 methyl groups per silicon atom and (2) from about 0.05 to 5 per cent, by weight, based on the weight of (1)

[1] NOTE.—Liquid aliphatic-substituted polysiloxanes containing an average of about 1.9 to less than 2.0 aliphatic groups per silicon atom may be prepared, for example, by hydrolyzing a mixture of aliphatic-substituted chlorosilanes containing an average of about 1.9 to less than 2.0 aliphatic groups per silicon atom.

of an additive selected from the class of saturated aliphatic fatty acids containing from 8 to 14 carbon atoms.

3. A lubricant having a low boundary friction coefficient which consists essentially of (1) a liquid water-free methyl polysiloxane containing an average of from about 1.9 to 2.5 methyl groups per silicon atom and (2) from about 0.05 to 5 per cent, by weight, based on the weight of (1) of lauric acid.

4. A lubricant having a low boundary friction coefficient which consists essentially of (1) a liquid water-free methyl polysiloxane containing an average of from about 1.9 to 2.5 methyl groups per silicon atom and (2) from about 0.05 to 5 per cent, by weight, based on the weight of (1) of myristic acid.

5. A lubricant having a low boundary friction coefficient which consists essentially of (1) a liquid water-free methyl polysiloxane containing an average of from about 1.9 to 2.5 methyl groups per silicon atom and (2) from about 0.05 to 5 per cent, by weight, based on the weight of (1) of capric acid.

DONALD F. WILCOCK.

REFERENCES CITED

The following references are of record in the file of this patent:

UNITED STATES PATENTS

| Number | Name | Date |
|---|---|---|
| 2,406,671 | Diamond | Aug. 27, 1946 |
| 2,416,503 | Trautman | Feb. 25, 1947 |